(12) United States Patent
Gupta et al.

(10) Patent No.: US 10,147,071 B2
(45) Date of Patent: Dec. 4, 2018

(54) VISUAL REPRESENTATION OF AN EMAIL CHAIN

(71) Applicant: International Business Machines Corporation, Armonk, NY (US)

(72) Inventors: Saurabh Gupta, Durham, NC (US); Sandeep Perumbuduri, Morrisville, NC (US); Nancy A. Schipon, Apex, NC (US); Jack P. Yapi, Knightdale, NC (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 14/665,636

(22) Filed: Mar. 23, 2015

(65) Prior Publication Data
US 2016/0283069 A1    Sep. 29, 2016

(51) Int. Cl.
*G06Q 10/10* (2012.01)
*H04L 12/58* (2006.01)

(52) U.S. Cl.
CPC .......... *G06Q 10/10* (2013.01); *G06Q 10/107* (2013.01); *H04L 51/16* (2013.01); *H04L 51/32* (2013.01)

(58) Field of Classification Search
CPC .............................. G06Q 10/107; H04L 51/16
See application file for complete search history.

(56) References Cited

U.S. PATENT DOCUMENTS

| | | | |
|---|---|---|---|
| 7,356,772 B2 | 4/2008 | Brownholtz et al. | |
| 7,506,263 B1 | 3/2009 | Johnston et al. | |
| 8,200,762 B2 * | 6/2012 | Staats | G06Q 10/107 709/206 |
| 8,510,664 B2 | 8/2013 | Rueben et al. | |
| 8,700,756 B2 * | 4/2014 | Chidlovskii | G06Q 10/10 709/206 |
| 9,245,259 B2 * | 1/2016 | Bovet | H04L 51/22 |
| 2005/0004990 A1 * | 1/2005 | Durazo | G06Q 10/107 709/206 |
| 2005/0138070 A1 * | 6/2005 | Huberman | G06Q 10/10 |

(Continued)

FOREIGN PATENT DOCUMENTS

EP    2770761 A1    8/2014

OTHER PUBLICATIONS

Immersion: A Platform for Visualization and Temporal Analysis of Email Data MIT 2014.*

(Continued)

*Primary Examiner* — William Bashore
*Assistant Examiner* — Nathan Shrewsbury
(74) *Attorney, Agent, or Firm* — Joseph J. Petrokaitis; Gregory K. Goshorn; Greg Goshorn, P.C.

(57) ABSTRACT

Provided are techniques for presenting a visual representation of an email thread, comprising organizing a plurality of emails in an email system with respect to a plurality of parties; organizing the plurality of emails with respect to an email thread to produce thread information; correlating the plurality of parties with thread information to produce a condensed tree structure to represent plurality of parties and the plurality of emails, wherein each node of a plurality of nodes of the condensed tree structure represents one corresponding party of the plurality of parties; and rendering the condensed tree structure on a computer display.

20 Claims, 8 Drawing Sheets

(56) References Cited

U.S. PATENT DOCUMENTS

| | | | |
|---|---|---|---|
| 2006/0080422 A1* | 4/2006 | Huberman | G06Q 10/10 709/223 |
| 2007/0282956 A1* | 12/2007 | Staats | G06Q 10/107 709/206 |
| 2008/0086551 A1* | 4/2008 | Moy | G06Q 10/10 709/223 |
| 2009/0282086 A1* | 11/2009 | Heimes | H04L 12/585 |
| 2011/0087968 A1* | 4/2011 | Lakshmanan | G06Q 10/10 715/751 |
| 2012/0011448 A1 | 1/2012 | Tse | |
| 2012/0290672 A1* | 11/2012 | Robinson | G06Q 10/10 709/206 |
| 2013/0135314 A1* | 5/2013 | Haggerty | G06Q 10/107 345/440 |
| 2013/0262590 A1 | 10/2013 | Patil et al. | |

OTHER PUBLICATIONS

Visualizing Email Content: Portraying Relationships from Conversational Histories, Viegas et al CHI 2006.*
Thread ARCS: An Email Thread Visualization Bernard Kerr Collaborative User Experience Group IBM Research 2003.*
Rohall et al., "Email Visualization to Aid Communications," IBM Research, downloaded from <http://www.watson.ibm.com/cambridge/Technical_Reports/2001/remail-steve%20rohall.pdf> on Mar. 24, 2015.

* cited by examiner

VISUAL REPRESENTATION OF AN EMAIL CHAIN

FIELD OF DISCLOSURE

The claimed subject matter relates generally to electronic communications and, more specifically, to techniques for the organization and display of emails so that the emails are easier to understand and follow.

BACKGROUND OF THE INVENTION

Electronic mail, or "email," is a vital part of current communications, both for personal and business interaction. It is advantageous to visualize current email application threads, i.e., series of related communications or email "chains," to allow easier navigation and exploration. However, typical sequential email threads may become disconnected and difficult to visualize. For example, 1) Alex (A) emails Bill (B), Charlie (C), Diana (D) and so on; 2) C replies to A such that B and D also receive the email; 3) B replies to C's comments but in a response to A; 4) C replies to B's comments but in a response to A Obviously, the thread can become disconnected and, therefore difficult to visualize. In other words, email conversations, which are presented in a sequential format may not actually be sequential. In this manner, a conversation represented by an email chain can become con fusing and difficult to follow. In addition, details concerning particular emails and email threads may be hard to determine due to a lack of means for visualizing emails and threads.

SUMMARY

Provided are techniques for the organization and display of email threads. Emails are represented by icons is a visual display. A condensed representation of a tree-structure visualization for email threads is provided. In other words, a tree structure representation of an email thread is provided in which each node represents a single party or subject in the thread and various elements associated with each node such as, but not limited to, colors, bars, arrows and icons represent information on emails between the parties in the thread. In this manner, a graph representing a thread does not continue to grow as more emails are sent back and forth among parties. Further, represented parties may be individuals or organized groups of individuals.

In addition, a user, by selecting a particular icon, can choose which message to which to respond. Users may "hover" on a particular icon to display additional details on the corresponding response. Also included are options that enable a user to consolidate emails and append one or more emails to another. There is also an option to generate a word cloud with respect to a particular thread. A word cloud is a visual representation of text such that the frequency and/or importance of specific words may be quickly ascertained.

Provided are techniques for presenting a visual representation of an email thread, comprising organizing a plurality of emails in an email system with respect to a plurality of parties; organizing the plurality of emails with respect to an email thread to produce thread information; correlating, the plurality of parties with thread information to produce a condensed tree structure to represent plurality of parties and the plurality of emails, wherein each node of a plurality of nodes of the condensed tree structure represents one corresponding party of the plurality of parties; and rendering the condensed tree structure on a computer display.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
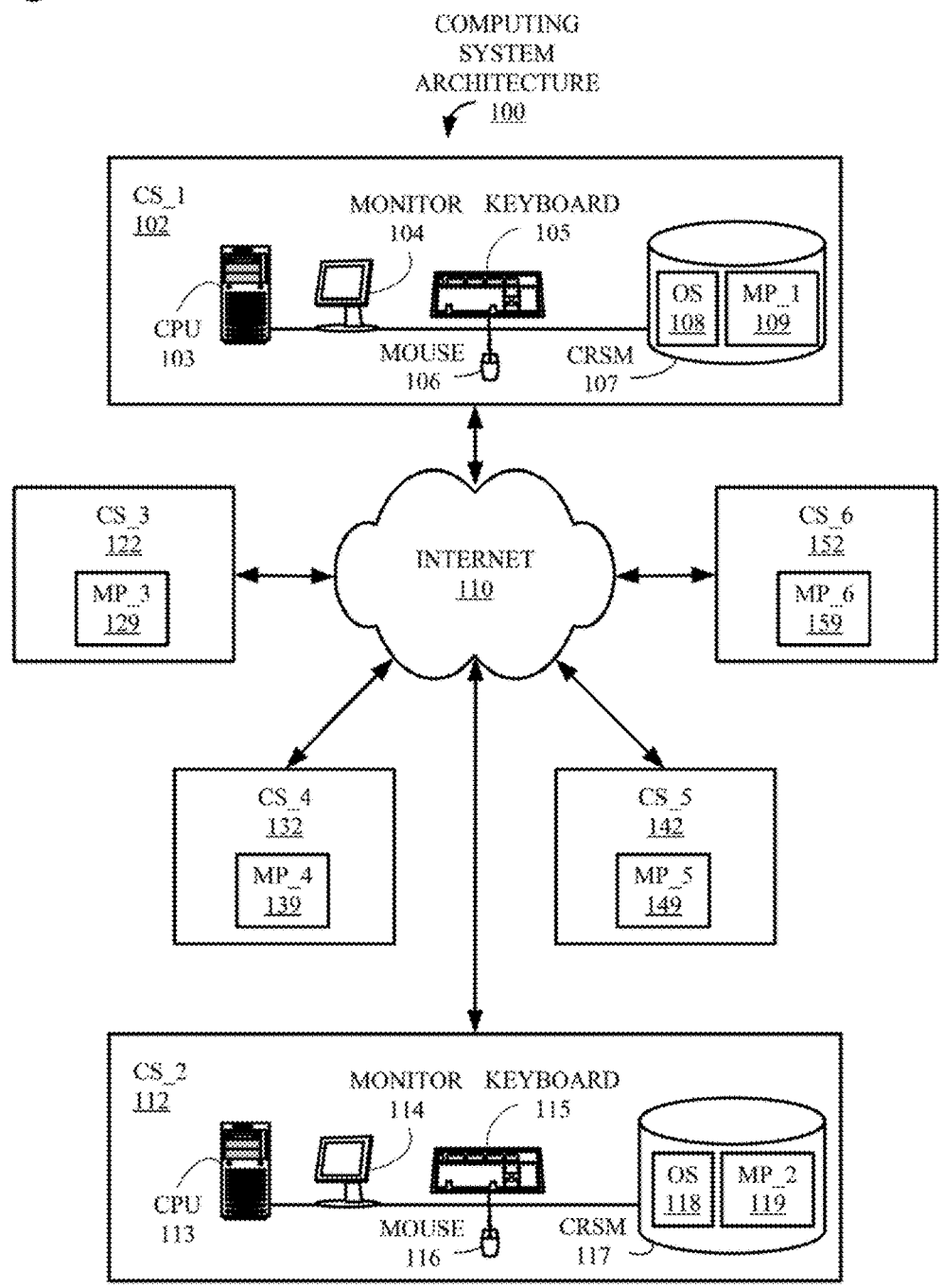
FIG. 1 is a computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have realized, typical tree-structure representations of email threads can become so large that the usefulness in representing the threads may be lost. In other words, currently available visualizations of email threads may grow larger and larger as more and more emails are sent back and forth among parties.

Turning now to the figures. FIG. 1 is a block diagram of one example of a computing system architecture 100 that may incorporate the claimed subject matter. It should be noted there are many possible computing system configurations that may implement the disclosed technology, of which computing system architecture 100 is only one simple example A computing system, or "CS_1," 102 includes a central processing unit (CPU) 103, coupled to a monitor 104, a keyboard 105 and a pointing device, or "mouse," 106, which together facilitate human interaction with CS_1 102 and other elements of architecture 100. CPU 103 would comprise, among other things, one or more processors (not shown). Also included in CS_1 102 and attached to CPU 103 is a computer-readable storage medium (CRSM) 107, which may either be incorporated into CS_1 102 i.e. an internal device, or attached externally to CPU 1034 by means of various, commonly available connection devices such as but not limited to, a universal serial bus (USB) port (not shown). CRSM 107 is illustrated, storing an operating system (OS) 108 and a Mail Program (MP_1) 109, which is described in more detail below in conjunction with FIGS. 2-8.

CS_1 102 is communicatively coupled to the Internet 110. Also coupled to Internet 110, and thereby able to communicate with CS_1 102 and each other via network 110, are several other computing systems, i.e., a CS_2 112, a CS_3 122, a CS_4 132, a CS_5 142 and a CS_6 152. In this example, CS_2 112 is also illustrated with a CPU 113, a monitor 114, a keyboard 115, a mouse 116 and a CRSM 117. Like elements 104-106, monitor 114, keyboard 115 and mouse 116 enable human interaction with CS_2 112. CRSM 117 is illustrated storing an OS 118 and mail program, or MP_2, 119, which is described in more detail below in conjunction with FIGS. 2-8. Although in this example, CSs 102, 112, 122, 132, 142 and 152 are communicatively coupled via network 110, they could also be coupled through any combination of communication mediums such as, but not limited to, a local area network (LAN) (not shown), a wide area network (WAN) and the direct wires.

Although not shown for the sake of simplicity, CS_3 122, CS_4 132, CS_5 142 and CS_6 152 would also typically include a CPU, monitor, keyboard, mouse and CRSM. CS_3 122, CS_4 132, CS_5 142 and CS_6 152 are illustrated storing logic associated with mail programs, i.e., a MP_3 129, a MP_4 139, a MP_5 139 and a MP_6 159, respectively, which are explained in more detail below in conjunction with FIGS. 5 and 6. Logic associated with MPs 109, 119, 129, 139, 149 and 159 is typically stored on CRSMs (some not shown) of the corresponding devices and executed on one or more processors (not shown) of the corresponding CPUs (some not shown). In the following description, computing systems 102, 112, 122, 132, 142 and 152 are used as examples of systems that exchange emails among different users and, in the examples, each computing system is associated with a particular user.

Figure 2:
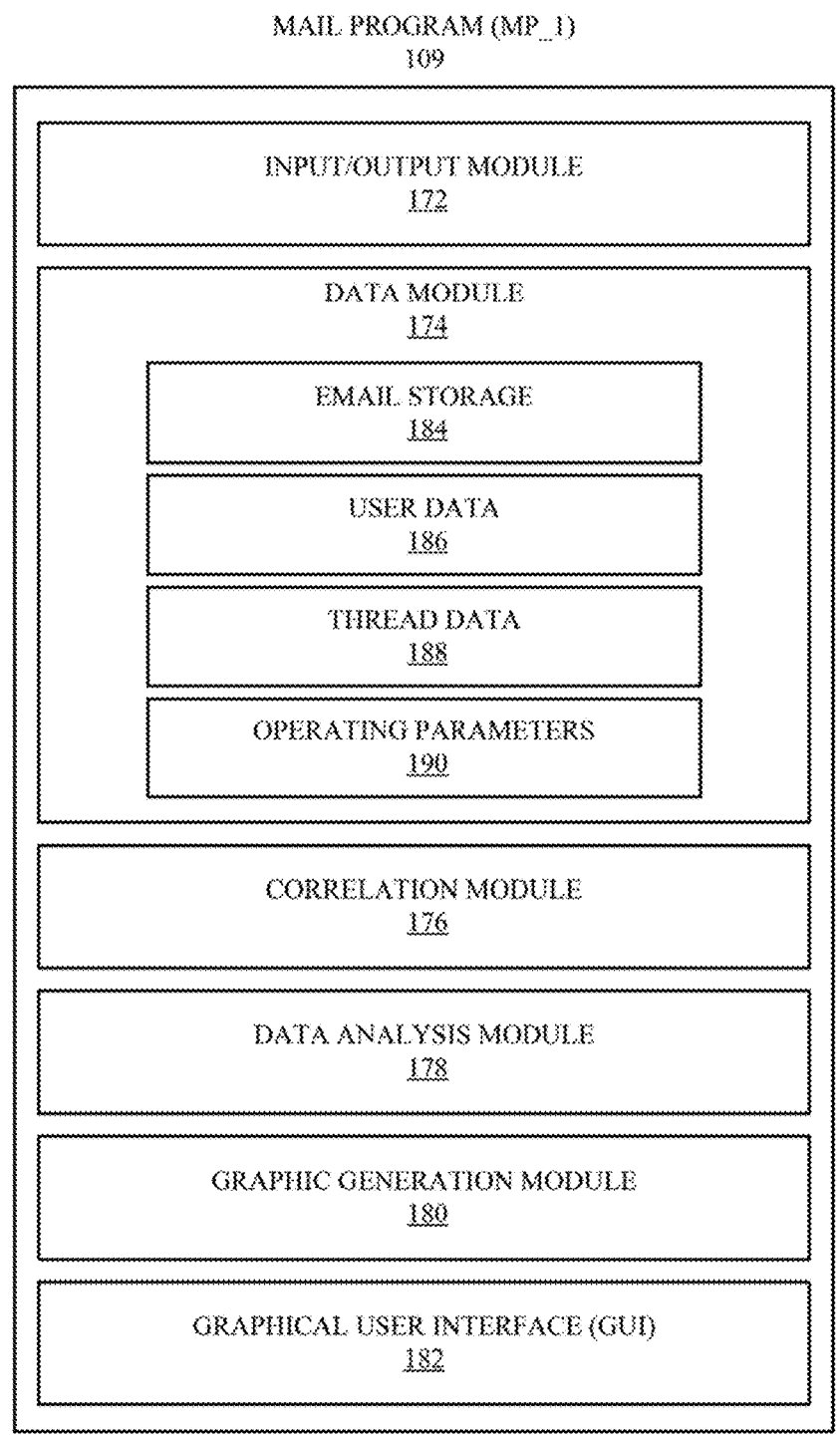
FIG. 2 is a block diagram of a mail program configured in accordance with the claimed subject matter.

FIG. 2 is a block diagram of a mail program configured in accordance with the claimed subject matter. In this example, the illustrated mail program is MP_1 109, first introduced above in conjunction with FIG. 1. MP_1 109 includes an input/output (I/O) module 172, a data module 174, a correlation module 176, a data analysis module 178, a graphic generation module 180 and a graphical user interface (GUI) module, or simply "GUI," 182. For the sake of the following examples, logic associated with MP_1 109 is assumed to be stored on CRSM 107 of CS_1 102 (FIG. 1) and execute on one or more processors (not shown) of CPU 103 (FIG. 1). It should be understood that the claimed subject matter can be implemented in many types of computing systems and data storage structures but, for the sake of simplicity, is described only in terms of CS_1 102 and system architecture 100 (FIG. 1). Further, the representation of MP_1 109 in FIG. 2 is a logical model. In other words, components 172, 174, 176, 178, 180 and 182 may be stored in the same or separates files and loaded and/or executed within system 100 either as a single system or as separate processes interacting via any available inter process communication (IPC) techniques. In addition, functionality of MP_1 109 may be provided by a mail server (not shown) that provides email capability concurrently to multiple users.

I/O module 172 handles any communication MP_1 109 has with other components of system 100 and other MPs such as MPs 119, 129, 139, 149 and 159. It should be understood that typically mail is not transmitted directly between computing systems but is handled by mail servers (not shown) that route messages among multiple machines across the world. For the sake of simplicity, in the following figures and description, mail is illustrated and described as merely being transmitted from user to user and computing system to computing system.

Data module 174 is a data repository for stored emails and other data employed to implement the claimed subject matter. Although illustrated as stored on CRSM 107, much of the data stored in data module 174 could also be stored in conjunction with a mail server (not shown) on a remote device (not shown). Examples of the types of information stored in data module 174 include email storage 184, user data 186, thread data 188 and operating parameters 190. In this example, email storage 184 stores actual email messages that have been sent to or from a user associated with CS_1 102. User data 186 stores information corresponding to other users that may have potentially had email either sent to or from MP_1 119. Thread data 188 stores information on the connection and correlation among the email messages stored in email storage 184. Operating parameters 190 includes information on various user and administrative preferences that have been set. For example, a user or administrator may specify that a displayed email tree (see FIGS. 3 and 4) may be limited to a specific number of levels. In addition, a user or administrator may specify the default information displayed in conjunction with an email message (see FIG. 5).

Correlation module 176 parses incoming and outgoing emails to determine potential recipients and subjects to which a particular email may apply. Data analysis module 178 parses the messages stored in email storage 184 in accordance with user request for particular types of displays (see 200, FIG. 3, 250, FIG. 4, 300, FIG. 5 and 350, FIG. 6). In other words, data analysis module 178 generates the information necessary to populate displays 200, 250, 300 and 350. Graphic generation module 180 includes logic to generate word clouds, graphs and other types of displays when requested by a user. Components 172, 174, 176, 178 and 180 are described in more detail below in conjunction with FIGS. 3-8.

GUI 182 provides an interface for users to send, receive and display information on emails. GUI 182 also enables users of MP_1 109 to interact with and to define the desired functionality of MP_1 109 typically by the setting of variables in operating parameters 188. GUI component 182 is described in more detail below in conjunction with FIGS. 3-6 and 8.

Figure 3:
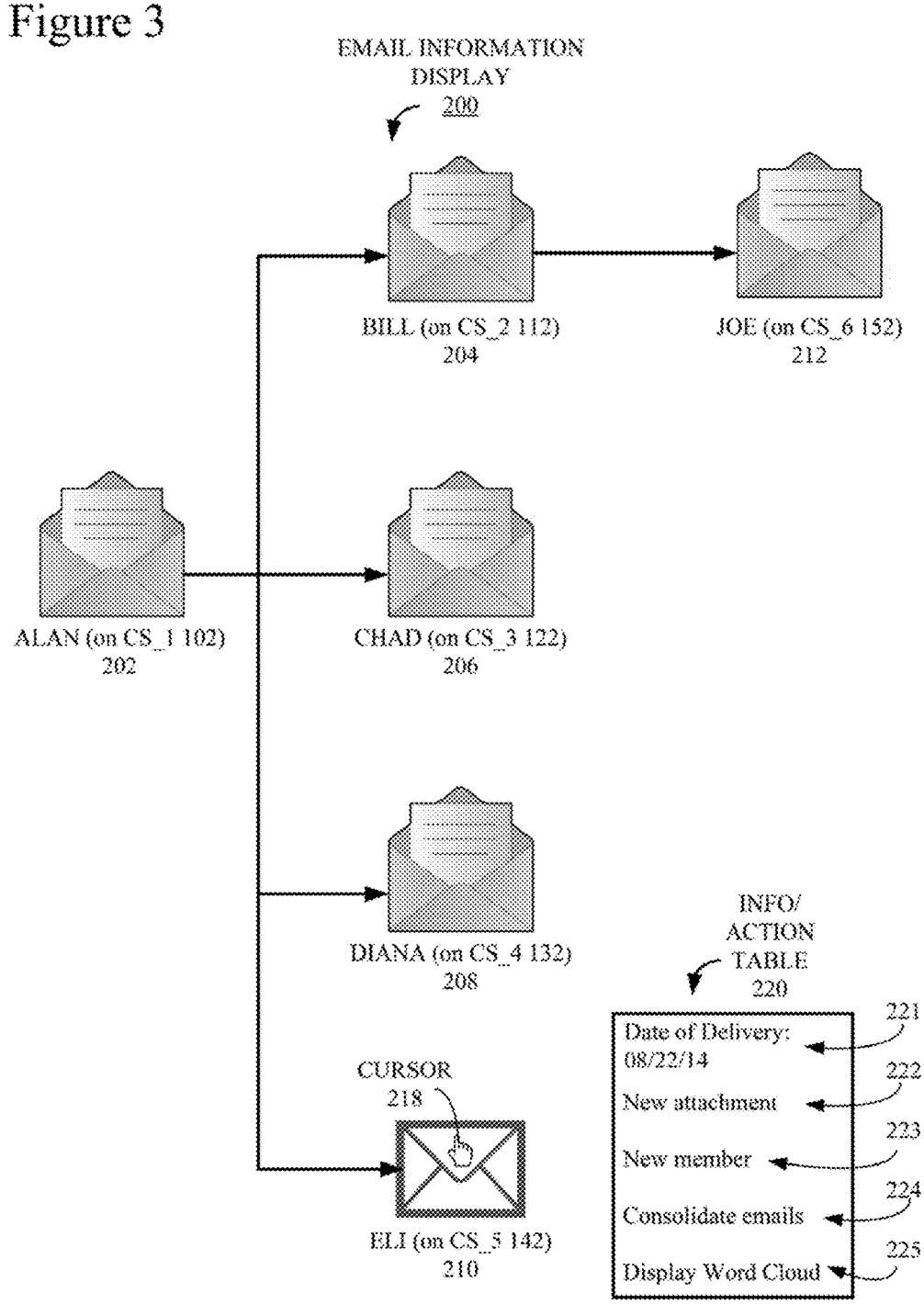
FIG. 3 is a first example of an informational display that may be generated in accordance with the disclosed technology.

FIG. 3 is an example of an Email Information Display 200 that may be generated in accordance with the disclosed technology. In this example, display 200 is generated by logic associated with MP_1 109 (FIGS. 1 and 2), stored on CRSM 107 (FIG. 1) and executed on one or more processors (not shown) of CPU 103 (FIG. 1) of CS_1 102 (FIG. 1). In addition, display 200 would be displayed by GUI 182 (FIG. 2) on monitor 104. In short, display 200 illustrates a email thread represented by an email that originated from Alan (on CS_1 102) and was transmitted to users on CS_2 112 (FIG. 1), CS_3 122 (FIG. 1), CS_4 132 (FIG. 1), CS_5 142 (FIG. 1) and CS_6 152 (FIG. 1). It should be noted that although the parties represented in FIGS. 3-6 may be individual users, the disclosed technology is equally applicable to the representation of groups of users, which are commonly employed in email system. Accordingly, although the description frequently describes the claimed subject matter in terms of "users," the claimed subject matter also applies to more general terms to "parties," which may include, but is not limited to, organized groups of users and other entities.

Display 200 provides a graphical representation of a particular email thread that includes several emails that have been opened by the corresponding recipient as indicated by an opened envelope icon. Email 202 from Alan (on CS_1 102) represents the beginning email in the thread. In this example, email 202 has been transmitted to and opened as email 204 by Bill (on CS_2 112), email 206 by Chad (on CS_3 122) and email 208 by Diana (on CS_4 132). In addition, email 202 has been transmitted as email 210 to Eli (on CS_5 142) but has not been opened and read as indicated by an unopened envelope icon. Email 204 has also been forwarded by Bill to Joe (on CS_6 152) as email 212. In this manner, MP_1 109 is able to provide a type of information that is not available to a user in current email programs.

Another feature illustrated by display 200 is the ability to position, or "hover," a cursor 218 over a particular icon, in this case email 210, and display an Icon/Action Table 220 corresponding to the particular icon to provide addition information and actions that are not available in currently available email products. In this example, the additional information includes a "Date of Delivery," which in this example is Aug. 22, 2014, 221 and action options including a "New Attachment" option 222 for attaching a new file, a "New member" option 223 for adding a new user to the thread, a "Consolidate emails" option 224 for grouping multiple email messages into a single message and a "Display Word Cloud" option 225 for the generation and display of a word cloud corresponding to selected emails (see 294, FIG. 5).

Figure 4:
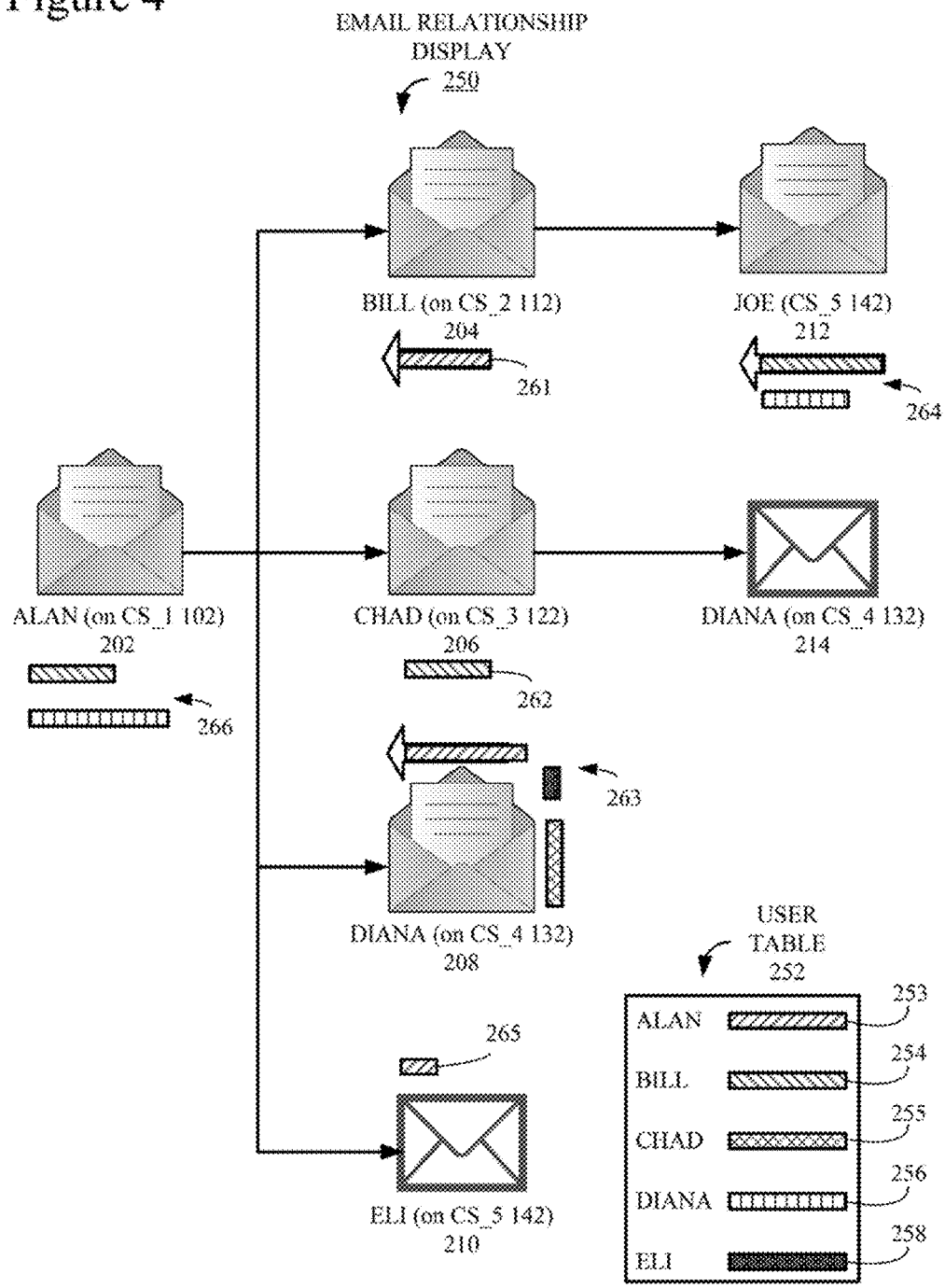
FIG. 4 is a second example of an informational display that may be generated in accordance with the disclosed technology.

FIG. 4 is an example of an Email Relationship Display 250 that may be generated in accordance with the disclosed technology. Like display 200 (FIG. 3), in this example, display 250 is generated by logic associated with MP_1 109 (FIGS. 1 and 2), stored on CRSM 107 (FIG. 1) and executed on one or more processors (not shown) of CPU 103 (FIG. 1) of CS_1 102 (FIG. 1). In addition, display 250 would be displayed by GUI 182 (FIG. 2) on monitor 104. Display includes emails 202, 204 206, 208, 210 and 210, as illustrated above in FIG. 3. In addition to the emails of FIG. 3, display 250 also indicates that email 206 was forwarded as email 214 to Diana, possibly with additional comments or attachments.

A User Table 252 includes a legend to correlate displayed graphic elements to particular users within display 250. It should be understood that the patterns are only examples and that other representational schemes may be employed. For example, graphical elements may be color coded. A pattern_1 253 identifies data associated with Alan, a pattern_2 254 is associated with Bill, a pattern_3 255 with Chad, a pattern_4 256 with Diana and a pattern_5 258 with user Eli.

A arrow 261 associated with email 204 indicates that Bill responded to Alan as represented by pattern_1 253 within arrow 261. A bar 262 associated with email 206 indicates that Chad send a message relating to email 206 to Bill as represented by Pattern_2 254 within bar 262. In a similar fashion, an arrow and two (2) bars 263 indicates that Diana replied to Alan and sent messages relating to email 208 to Chad and Eli. An arrow and a bar 264 indicate that Joe relied to Alan and sent related messages to Diana. A bar 265 indicates that Eli 210 sent a message to Alan 202. Bars 266 indicate that Alan 202 received emails from Bill 204 and Diana 208. The fact that there are no bars or arrows shown in conjunction with Diana 214 indicates that, in addition to being unread, Diana has not replied or otherwise responded to this particular email 214.

In this example, the length of bars and arrows 261-266 represent a number of emails, for example bars 266 may indicate that Alan 202 received two (2) emails from Bill 261 and three (3) emails from Diana 208. It should be noted that graphic indicators 263 and 265 are arranged in an alternative format, i.e., displayed around corresponding user 208 rather than under as in the other icons. Typically one format would be used in any particular display but that two (2) are shown in FIG. 4 merely to illustrate that there may be multiple possible techniques. For example, in addition to under and around, graphic representations may be displayed within a corresponding email icon. In this manner, the information of email chains is condensed in that a simple tree structure such as display 205 is able to provide many different types of information without becoming overly cumbersome and confusing. Further, the specific information represented in display 250 are only a few examples. It should be understood that those with skill in the relevant arts might wish to represent additional types of information using the disclosed techniques.

Figure 5:
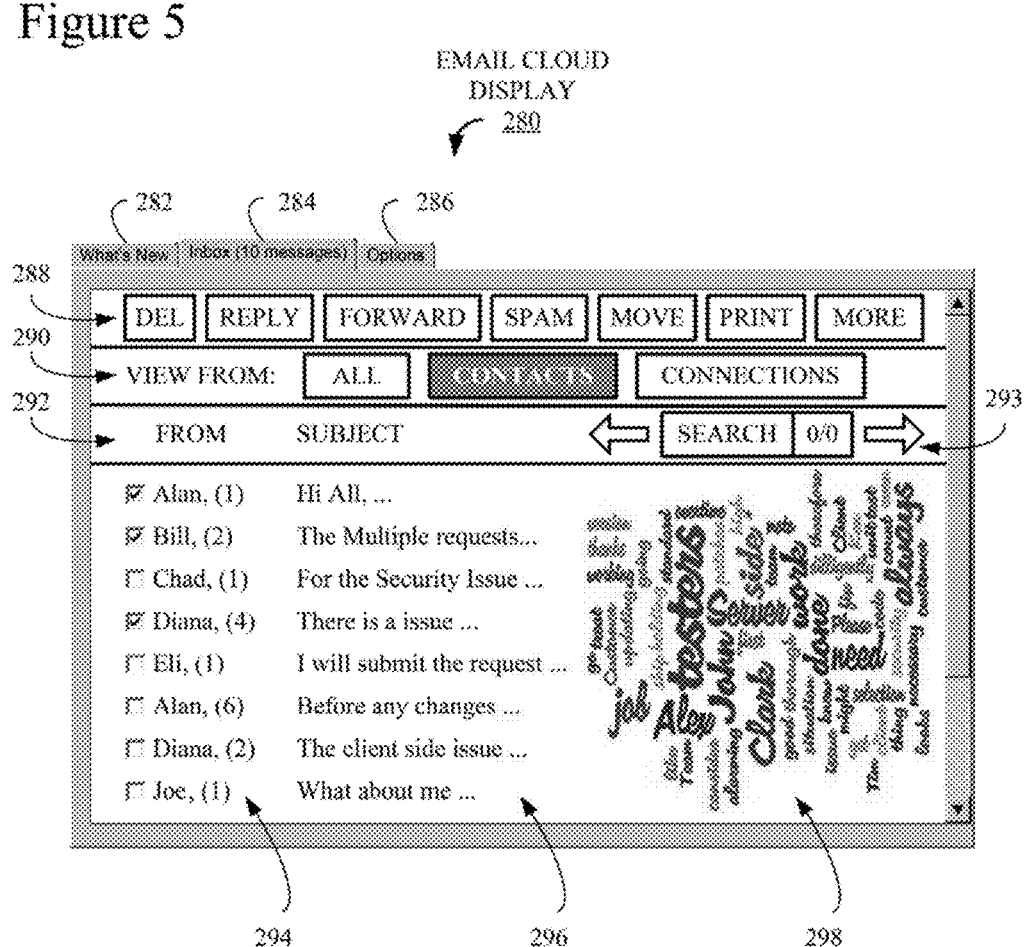
FIG. 5 is a third example of an informational display that may be generated in accordance with the disclosed technology.

FIG. 5 is an example of an Email Cloud Display 280 that may be generated in accordance with the disclosed technology. Like displays 200 (FIG. 3) and 250 (FIG. 4), in this example, display 280 is generated by logic associated with MP_1 109 (FIGS. 1 and 2), stored on CRSM 107 (FIG. 1) and executed on one or more processors (not shown) of CPU 103 (FIG. 1) of CS_1 102 (FIG. 1). In addition, display 280 would be displayed by GUI 190 (FIG. 2) on monitor 104.

Display 280 has three (3) optional tabs, i.e., a "What's New" tab 282, a "Inbox" tab 284 and an "Options" tab 286. In this example, Inbox tab 284 is displayed in display 280 as indicated by the fact that tab 284 is larger and on top of tab 282 and 286. Tab 284 provides a number of possible actions 288, including a "Delete," or "Del," a "Reply," a "Forward," a "Spam," a "Move," a "Print," and a "More," which would display additional actions. Actions 288 enable a user to manipulate email threads, introduced below, and should be familiar to those with skill in the relevant arts. A "View From" menu bar 290 enable users to select a particular organization, or "view," of potential emails, including "All," "Contacts" and "Connections." The emails displayed below are organized by Contacts as indicated by a darkening of the selected view, "Contacts." A title bar 292 names the corresponding columns of information within the displayed emails, including "From" and "Subject." A Search box 293 enables to user to display only those emails that meet a user defined criteria, typically based upon keywords.

A From column 294 lists the corresponding users names, i.e., Alan, Bill, and so on. A checkbox immediately before each name enables a user to select a particular email thread for further processing. In this example, the first "Alan" thread, the "Bill" thread and the first "Diana" thread are selected. A number in parenthesis immediately following each name indicates the number of emails corresponding to each user. A Subject column 296 displays the subject header of the corresponding emails. For example, Alan has one (1) email with the subject header "Hi, All . . . " and six (6) emails with the header "Before any changes . . . "

A word cloud 298 corresponds to the email threads selected by means of the checkboxes immediately before each name in From column 294. A word, or "tag," cloud is a visual representation of text data with attributes such as, but not limited to, position, size, font and color of any particular word within the cloud representing attributes such as, but not limited to, importance, relevance and frequency.

Figure 6:
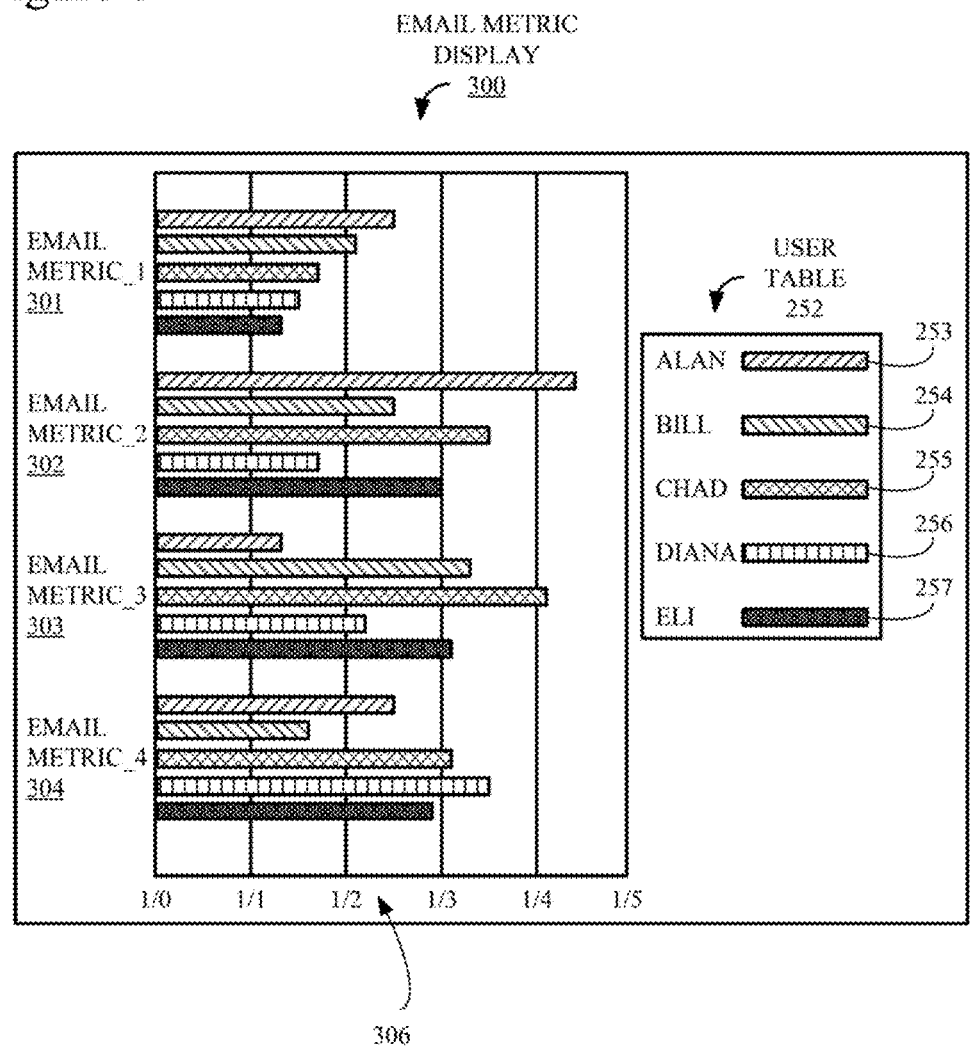
FIG. 6 is a fourth example of an informational display that may be generated in accordance with the disclosed technology.

FIG. 6 is an example of Email Metric Display 300 that may be generated in accordance with the disclosed technology. Like displays 200 (FIG. 3), 250 (FIG. 4) and 280 (FIG. 6), in this example, display 300 is generated by logic associated with MP_1 109 (FIGS. 1 and 2), stored on CRSM 107 (FIG. 1) and executed on one or more processors (not shown) of CPU 103 (FIG. 1) of CS_1 102 (FIG. 1). In addition, display 300 would be displayed by GUI 182 (FIG. 2) on monitor 104. Like display 250, display 300 includes User Table 252 (FIG. 4), which correlates each email user with a particular bar within the graphs described below.

Display 300 displays bar graphs, each bar graph representing a particular analysis of selected emails (see 294, FIG. 5). In this example, four (4) graphs are represented, i.e., an "Email Metric_1" graph 301, an "Email Metric_2" graph 302, an "Email Metric_3" graph 303 and an "Email Metric_4" graph 304. Graphs 301-304 represent different email metrics that may be calculated and displayed. Such metrics may include topics such as, but not limited to, time to respond, number of users addressed and metrics associated with particular subjects. In addition, metrics may be generated based upon specific email topics such as, but not limited to, education, security compliance, business compliance, customer contracts and problem resolution activity One with skill in the relevant arts should appreciate that many different types of metrics may be associated with emails and the examples provided are not intended to be limiting in either nature or number. Below graphs 301-304 are a series of dates 306 representing, in this example, day 1, zero hours ("1/0") through day 1, five hours ("1/5"). Of course different scales may be applied to different types of metrics.

Figure 7:
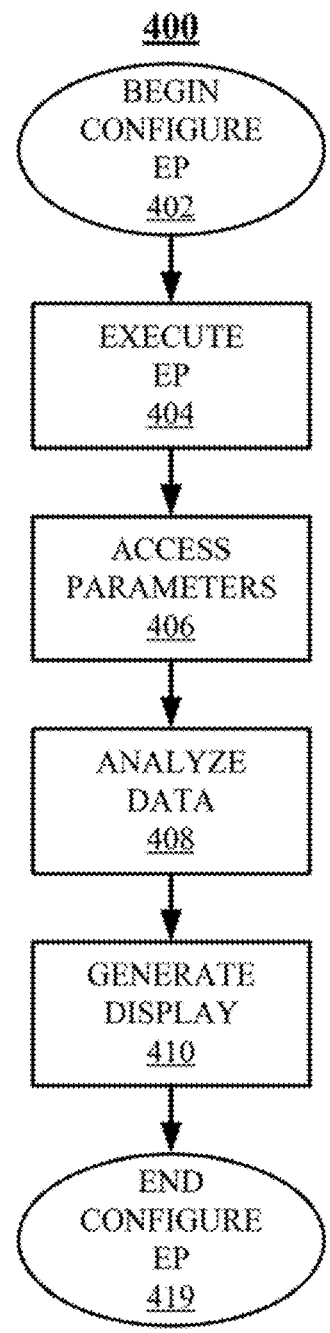
FIG. 7 is a flowchart of an example of a "Configure Email Program" process that may implement aspects of the claimed subject matter.

FIG. 7 is a flowchart of an example of a "Configure Email Program" process 400 that may implement aspects of the claimed subject matter. In this example, logic associated with process 400 is stored in conjunction with MP_1 109 (FIGS. 1 and 2) on CRSM 107 (FIG. 1) of CS_1 (FIG. 1) and executed on one or more processors (not shown) of CPU 103 (FIG. 1).

Process 400 starts in a "Begin Configure Email Program (EP)" block 402 and proceeds immediately to a "Execute EP" block 404. During processing associated with block 404, logic associated with MP_1 109 is initiated, or "launched," typically deliberately by a user of CS_1 102. Of course, MP_1 109 may also be started as the result of a preconfigured startup procedure on CS_1 102. During processing associated with an "Access Parameters" block 406, MP_1 109 accesses data in operating parameters 190 (FIG. 2) to determine an initial configuration, either a default configuration or set by a user or administrator. During processing associated with an "Analyze Data" block 408, email storage 184 (FIG. 2), user data 186 (FIG. 2) and thread data 188 (FIG. 2) are accessed to collect and analyze any information necessary to generate an initial display (see FIGS. 3-6) in accordance with operating parameters 190 accessed during processing associated with block 406. During processing associated with a "Generate Display" block 410, an appropriate display, such as one of displays 200 (FIG. 3), 250 (FIG. 4), 280 (FIG. 5) and 300 (FIG. 6), is generated based upon the information and analysis collected and performed during processing associated with block 408 and rendered on, in this example, monitor 104 (FIG. 1). Finally, control proceeds to an "End Configure EP" block 419 in which process 400 is complete.

Figure 8:
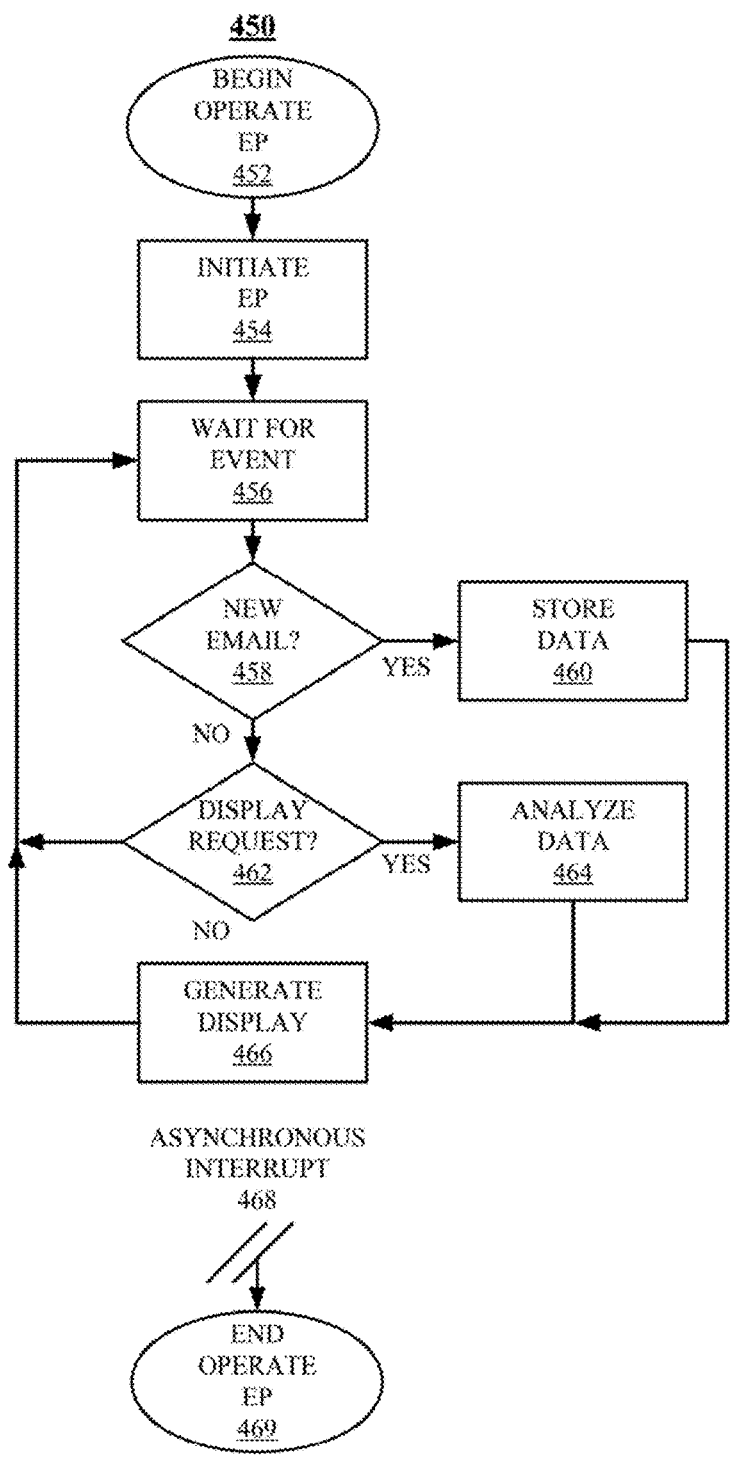
FIG. 8 is a flowchart of an example of a "Operate Email Program" process that may implement aspects of the claimed subject matter.

FIG. 8 is a flowchart of an example of an "Operate Email Program (EP)" process 450 that may implement aspects of the claimed subject matter. In this example, logic associated with process 450 is stored in conjunction with MP_1 109 (FIGS. 1 and 2) on CRSM 107 (FIG. 1) of CS_1 (FIG. 1) and executed on one or more processors (not shown) of CPU 103 (FIG. 1).

Process 450 starts in a "Begin Operate Email Program (EP)" block 452 and proceeds immediately to an "Initiate EP" block 454 (see 400, FIG. 7). During processing associated with block 454, MP_1 109 is launched, either deliberately by a user of CS_1 102 or as part of a preconfigured startup procedure on CS_1 102. During processing associated with a "Wait for Event" block 456, MP_1 109 waits for an event, which may be, but is not limited to, user interaction or the arrival of an email. Once an event occurs, control proceeds to a "New Email?" block 458. During processing associated with block 458, a determination is made as to whether or not the event detected during processing associated with block 456 is either the arrival of an email or a request by the user associated with CS_1 102 to send an email. In response to either an email send or an email reception, control proceeds to a "Store Data" block 460. During processing associated with block 460, the email and associated data are stored in relevant areas of data module 174 (FIG. 2), i.e., email storage 184 (FIG. 2), user data 186 (FIG. 2) and thread data 188 (FIG. 2).

If, during processing associated with block 458, a determination is made that the event received during processing associated with block 456 was not a new email, control proceeds to a "Display Request?" block 462. During processing associated with block 462, a determination is made as to whether or not the event received during processing associated with block 456 is a request for a particular display. If so, the appropriate analysis is performed (see 178, FIG. 2) to generate the requested display during processing associated with an "Analyze Data" block 264. Once data on new emails has been stored during processing associated with block 460 or analysis has been completed during processing associated with block 464, control proceeds to a "Generate Display" block 466. During processing associated with block 466, the requested display is uploaded to monitor 104 or, if the event is a new email, any email displays already displayed are updated.

Once the display has been updated, or, during processing associated with block 462, a determination is made that the event received during processing associated with block 456 is not a display request, control returns to Wait for Event block 456 during which MP_1 109 waits for the next event and processing continues as described above.

Finally, process 450 is halted by means of an asynchronous interrupt 468, which passes control to an "End Operate EP" block 469 in which process 450 is complete. Interrupt 468 is typically generated when the computing system, OS, browser, application, etc. of which process 450 is a part is itself halted. During normal operation, process 450 continuously loops through the blocks 454, 456, 458, 460, 462, 464 and 466, processing emails events as they occur.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for presenting a visual representation of an email thread, comprising:
    organizing a plurality of emails in an email system with respect to a plurality of parties;
    organizing the plurality of emails with respect to an email thread to produce thread information;

correlating the plurality of parties with the thread information to produce a condensed tree structure to represent plurality of parties and the plurality of emails with respect to a particular email thread;
  wherein each node of a plurality of nodes of the condensed tree structure represents one corresponding party of the plurality of parties and the particular email thread; and
  wherein each node displays each party of the plurality of parties that the corresponding party has corresponded with respect to the particular email thread; and
rendering the condensed tree structure on a computer display as a word cloud that displays the frequency and importance of specific words within the email thread.

2. The method of claim 1, wherein the plurality of parties includes organized groups of computer users.

3. The method of claim 1, further comprising displaying in conjunction with each particular node of the plurality of nodes, a graphic indication representing information corresponding to the party corresponding to the particular node.

4. The method of claim 3, wherein the graphic indication represents a number of emails the party corresponding to the particular node has in the email thread.

5. The method of claim 3, wherein the graphic indication represents an intended recipient of the emails of the party corresponding to the particular node.

6. The method of claim 1, further comprising;
generating metrics corresponding to the correlation of parties with thread information;
rendering a visual representation of the metrics on the computer display.

7. The method of claim 6, wherein the visual representation comprises the word cloud.

8. An apparatus for presenting a visual representation of an email thread, comprising:
  a plurality of processors;
  a computer-readable storage device;
  a display; and
  logic, stored on the computer-readable storage device and executed on the plurality of processors, for performing a method, the method comprising:
    organizing a plurality of emails in an email system with respect to a plurality of parties;
    organizing the plurality of emails with respect to an email thread to produce thread information;
    correlating the plurality of parties with the thread information to produce a condensed tree structure to represent plurality of parties and the plurality of emails with respect to a particular email thread;
      wherein each node of a plurality of nodes of the condensed tree structure represents one corresponding party of the plurality of parties and the particular email thread; and
      wherein each node displays each party of the plurality of parties that the corresponding party has corresponded with respect to the particular email thread; and
    rendering the condensed tree structure on the display as a word cloud that displays the frequency and importance of specific words within the email thread.

9. The apparatus of claim 8, wherein the plurality of parties includes organized groups of computer users.

10. The apparatus of claim 8, the method further comprising displaying in conjunction with each particular node of the plurality of nodes, a graphic indication representing information corresponding to the party corresponding to the particular node.

11. The apparatus of claim 10, wherein the graphic indication represents a number of emails the party corresponding to the particular node has in the email thread.

12. The apparatus of claim 10, wherein the graphic indication represents an intended recipient of the emails of the party corresponding to the particular node.

13. The apparatus of claim 8, the method further comprising:
generating metrics corresponding to the correlation of parties with thread information;
rendering a visual representation of the metrics on the computer display.

14. The apparatus claim 13, wherein the visual representation comprises the word cloud.

15. An apparatus for presenting a visual representation of an email thread, comprising a non-transitory computer-readable storage medium having program code embodied therewith, the program code executable by a plurality pf processors to perform a method comprising:
  organizing a plurality of mails in an email system with respect to a plurality of parties;
  organizing the plurality of emails with respect to an email thread to produce thread information;
  correlating the plurality of parties with the thread information to produce a condensed tree structure to represent plurality of parties and the plurality of emails with respect to a particular email thread;
    wherein each node of a plurality of nodes of the condensed tree structure represents one corresponding party of the plurality of parties and the particular email thread; and
    wherein each node displays each party of the plurality of parties that the corresponding party has corresponded with respect to the particular email thread; and
  rendering the condensed tree structure on a display as a word cloud that displays the frequency and importance of specific words within the email thread.

16. The apparatus of claim 15, wherein the plurality of parties includes organized groups of computer users.

17. The apparatus of claim 15, the method further comprising displaying in conjunction with each particular node of the plurality of nodes, a graphic indication representing information corresponding to the party corresponding to the particular node.

18. The apparatus of claim 17, wherein the graphic indication represents a number of emails the party corresponding to the particular node has in the email thread.

19. The apparatus of claim 15, the method further comprising;
generating metrics corresponding to the correlation of parties with thread information;
rendering a visual representation of the metrics on the computer display.

20. The apparatus of claim 19, wherein the visual representation comprises the word cloud.

* * * * *